US010478975B2

(12) United States Patent
Onal et al.

(10) Patent No.: US 10,478,975 B2
(45) Date of Patent: Nov. 19, 2019

(54) FABRICATION OF ROBOTIC MECHANISMS AND SYSTEMS FROM PLANAR SUBSTRATES

(71) Applicant: Worcester Polytechnic Institute, Worcester, MA (US)

(72) Inventors: Cagdas D. Onal, Allston, MA (US); Fuchen Chen, Worcester, MA (US); Weijia Tao, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 503 days.

(21) Appl. No.: 15/095,366

(22) Filed: Apr. 11, 2016

(65) Prior Publication Data

US 2016/0318194 A1   Nov. 3, 2016

Related U.S. Application Data

(60) Provisional application No. 62/145,679, filed on Apr. 10, 2015.

(51) Int. Cl.
*B25J 19/00* (2006.01)
*B62D 57/032* (2006.01)

(52) U.S. Cl.
CPC ............ *B25J 19/007* (2013.01); *B25J 19/00* (2013.01); *B62D 57/032* (2013.01); *Y10S 901/00* (2013.01); *Y10S 901/01* (2013.01)

(58) Field of Classification Search
CPC .... B25J 19/007; B62D 57/032; Y10S 901/01; B21D 5/00; A63H 33/04; A63H 33/16
See application file for complete search history.

(56) References Cited

U.S. PATENT DOCUMENTS

2016/0008726 A1\* 1/2016 Morris ................ A63H 33/106
446/314

OTHER PUBLICATIONS

Agheli, Mahdi, et al., "Design and Fabrication of a Foldable Hexapod Robot Towards Experimental Swarm Applications", May 31-Jun. 7, 2014, pp. 6.
Mehta, A., et al. "A Design Environment for the Rapid Specification and Fabrication of Printable Robots", International Symposium on Experimental Robotics (ISER), Marrakech and Essaouira, Morocco, 15 pages, Jun. 2014.

(Continued)

*Primary Examiner* — Rick K Chang
(74) *Attorney, Agent, or Firm* — Armis IP Law, LLC (57) ABSTRACT

A robotic configuration employs a system of low-cost, relatively lightweight beams and linkages fabricated from a planer material from a series of cuts and folds. The beams are folded along crease lines to form a 3-dimensional structure from a 2-dimensional substrate such as a polyester or other semi-rigid sheet. Tabs and appendages, or keys, cut into the planar material engage slots or apertures cut into adjacent members to define linkages. The linkages include tabs that are insertable in a one-way manner, such that removal is prevented but articulate and rotational movement is permitted by the resilient and flexible nature of the planar sheet material. An arrangement of beams and linkages are cut and formed based on a pattern imposed on a single planar sheet. The beam and linkage arrangement defines a robotic configuration for transport and other actions from an actuation source such as a motor.

6 Claims, 12 Drawing Sheets

(56) References Cited

OTHER PUBLICATIONS

Mehta, A., et al., "An End-to-End System for Designing Mechanical Structures for Print-and-Fold Robots", In Proc. IEEE International Conference on Robotics and Automation (ICRA), Hong Kong, China, 6 pages, Jun. 2014.

Onal, C.D., et al., "An Origami-Inspired Approach to Worm Robots", IEEE/ASME Transactions on Mechatronics, 18(2):430-438, Apr. 2013.

International Search Report and the Written Opinion for PCT/US2016/027256, dated Sep. 8, 2016.

* cited by examiner

FABRICATION OF ROBOTIC MECHANISMS AND SYSTEMS FROM PLANAR SUBSTRATES

RELATED APPLICATIONS

This patent application claims the benefit under 35 U.S.C. § 119(e) of U.S. Provisional Patent App. No. 62/145,679, filed Apr. 10, 2015, entitled "PLANAR MATERIAL BASED DESIGN AND FABRICATION OF FOLDABLE ROBOTS, MECHANISMS, AND DEVICES," incorporated by reference in entirety.

BACKGROUND

Fabrication and assembly of robotic units is typically associated with precise fabrication and machining of durable materials, requiring substantial time and engineering efforts to design, assemble and deploy each robotic unit. Animated members performing robotic functions such as assembly, material handling, and robot ambulation are often formed from raw stock of high strength steel, aluminum or titanium. Welding and bolting of robotic members is a common assembly medium, and drive mechanisms include gear, shaft and/or hydraulic based actuation mechanisms.

Development of robotic elements, features and components often requires fabrication and molding of the elements, and integration with mechanical hardware to enable moving joints. Techniques for producing the robotic features often involve expensive and time consuming molding, cutting and assembly techniques to establish the physical structure before enabling any of the robotic features. Further, any changes to the design tend to have a ripple effect as complementary parts attached to or interacting with the changed part usually also require change.

SUMMARY

A robotic configuration employs a system of low-cost, relatively lightweight beams and linkages fabricated from a planer material via a series of cuts and folds. The beams are folded along crease lines to form a 3-dimensional structure from a 2-dimensional substrate such as a polyester or other semi-rigid sheet. Tabs and appendages, or keys, cut into the planar material engage slots or apertures cut into adjacent members to define linkages. The linkages include tabs that are insertable in a one-way manner by the arrangement of folds, such that removal is prevented but articulate and rotational movement is permitted by the resilient and flexible nature of the planar sheet material. An arrangement of beams and linkages are cut and formed based on a pattern imposed on a single planar sheet. The beam and linkage arrangement defines a robotic configuration for transport and other actions by driving one or more of the interconnected beams from an actuation source such as a motor.

Configurations herein are based, in part, on the observation that robotic configurations to deploy an autonomous, mobile robotic unit employ a system of cooperative members for transport of the robotic unit, such as an assembly of pivotally connected elongated members that emulate "legs" for alternately contacting a ground surface for disposing the robotic unit forward. Unfortunately, conventional approaches to robotic member design and fabrication employ precision machining for precise control of robotic members, thus requiring substantial per-unit cost and design effort for generating a robotic configuration. Accordingly, configurations herein substantially overcome the above-described shortcomings by providing a planar material fabrication and design approach that employs lightweight materials in a planar or sheet goods form that employ an array of folds and cuts to form and connect functional units such as beams and linkages that allow pivotal, rotary and articulated movement of the beam members. A large number of independent robotic configurations may be rapidly developed and deployed at a relatively low-cost. Particular configurations are responsive to tasks that employ a so-called "swarm" of robotic units (robots) for fulfilling a directed task.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

FIG. 1b is a three dimensional kinematic model of the beams and linkages of FIG. 1a;

FIG. 2 is a diagram of the pattern defining the cuts and folds (creases) for the robotic configuration of FIG. 1a;

FIG. 4 is a flowchart for design of the pattern defining the robotic configuration of FIG. 1a;

DETAILED DESCRIPTION

Fabrication of structural members from a planar substrate is employed in construction of robotic configurations in the examples below. Other applications and uses may be envisioned for the fabrication methods disclosed herein. A rectangular robotic platform having flanking 3-leg assemblies is shown in a first configuration. A second configuration depicts a triangular base with a dual leg mechanism on each side of an equilateral triangle. In each configuration the disclosed method of fabricating robotic members and resulting apparatus includes generating a pattern on a planar material, such that the pattern includes creases and cuts on the planar material for defining functional units operative for robotic movement.

The planar material may include any suitable composition of sheet-type goods, such as a polyester sheet or PET (polyethylene terephthalate) having sufficient strength to support the robotic configuration for ambulatory movement yet resilient enough to permit flexural displacement of the linkages, discussed further below. A die or cutting process cuts the planar material along the generated cuts. Creases or folds may be defined by periodic cutting intervals, such as alternating cuts and solid portions along the crease line. The planar material is folded along the generated creases, and interconnected functional members formed based on the cut and folded planar material. The functional units are generally beams or linkages for interconnecting the beams, discussed further below.

In the examples below, the design and fabrication method and apparatus forms 3-dimensional (3D) rigid and semi-rigid jointed structures from 2-dimensional (2D) folded planar materials. The method of designing a mechanical system includes determining a kinematic structure that defines subsections and relationships between the subsections, in which the relationships identify connection and movement, and identifying, for each subsection, at least one basic structure that defines the subsection.

The basic structures include rigid members, flexural joints, and connectors, such as triangular beams, flexural revolute joints, and key-slot fasteners. Functional robotic are units formed from one or more of the basis structures. The method computes a crease pattern for forming a functional unit corresponding to the subsection, such that the crease pattern is applicable to form the basic structures of the subsection. The crease pattern is imposed on a planar material such as a low cost polyester sheet, but may be expanded to more substantial materials such as carbon fiber and metal sheeting.

Mechatronic and robotic development demands new design and fabrication techniques for mechanical systems to address open challenges regarding the assembly process, speed, and cost of traditional approaches. Advances in electronics and reduced size of components provide a potential to combine the mechanical and electrical subsystems in a unified assembly process. While layer-by-layer 3-D printing can fabricate highly complicated parts and assemblies, the manufacturing and assembly process is time-consuming and costly. As a potential solution, origami-inspired foldable structures are fabricated from thin sheets of raw material using planar manufacturing and subsequent folding techniques. The process includes cutting a crease pattern and folding the structure based on given blueprints. Cutting the crease patterns through the sheet of material, which may be performed with laser cutters, for example, is a rapid and inexpensive process.

In further detail, in the disclosed approach, identifying the basic structures may further include interrogating a database of basic structures for identifying a crease pattern corresponding to the basic structure, and, if none is found, defining a crease pattern corresponding to the basic structures, such that the basic structures are responsive to a folding according to the crease pattern for forming the subsection. Therefore, a database of basic structures, or modules, may be developed to accumulate a workable library of generic building blocks for facilitating rapid development Development may include determining if a plurality of basic structures correspond to the subsection, and computing a minimal number of crease patterns for forming the plurality of basic structures, for producing a number of basic structures from the same piece of material.

Completion of the complete mechanical system for a robot or other structure is performed in an iterative process that includes applying, for each of the defined crease patterns derived from the kinematic structure, the crease patterns to a planar material responsive to the folding, and forming each of the functional units according to the crease patterns defined for each of the subsections in the kinematic structure, typically involving cutting the multiple basic structure from a common piece of material. Connection of the subsections completes generation of the determined kinematic structure.

Figure 1A:
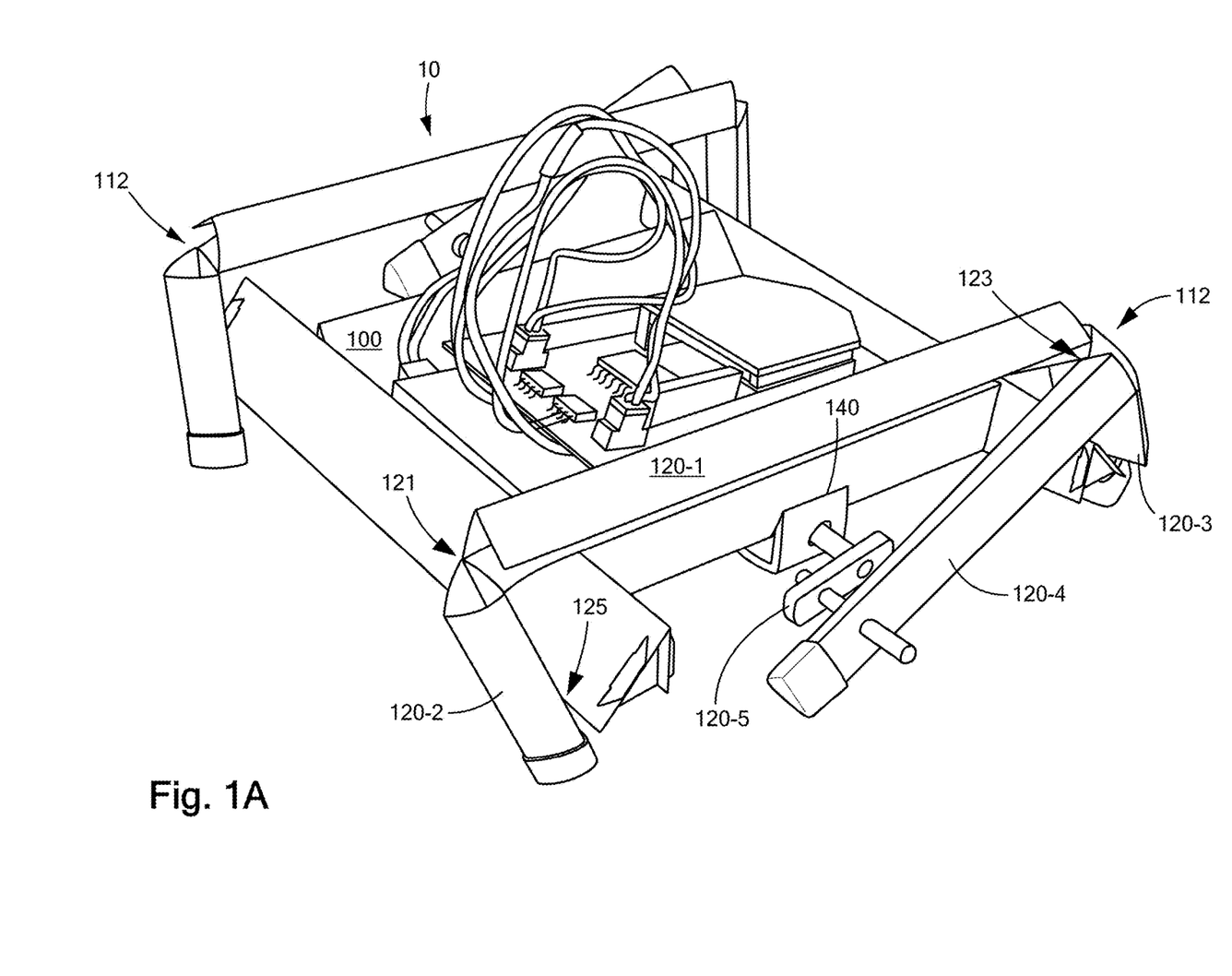
FIG. 1a is a perspective view of a robotic configuration formed from planar material based structural components.
Figure 1B:
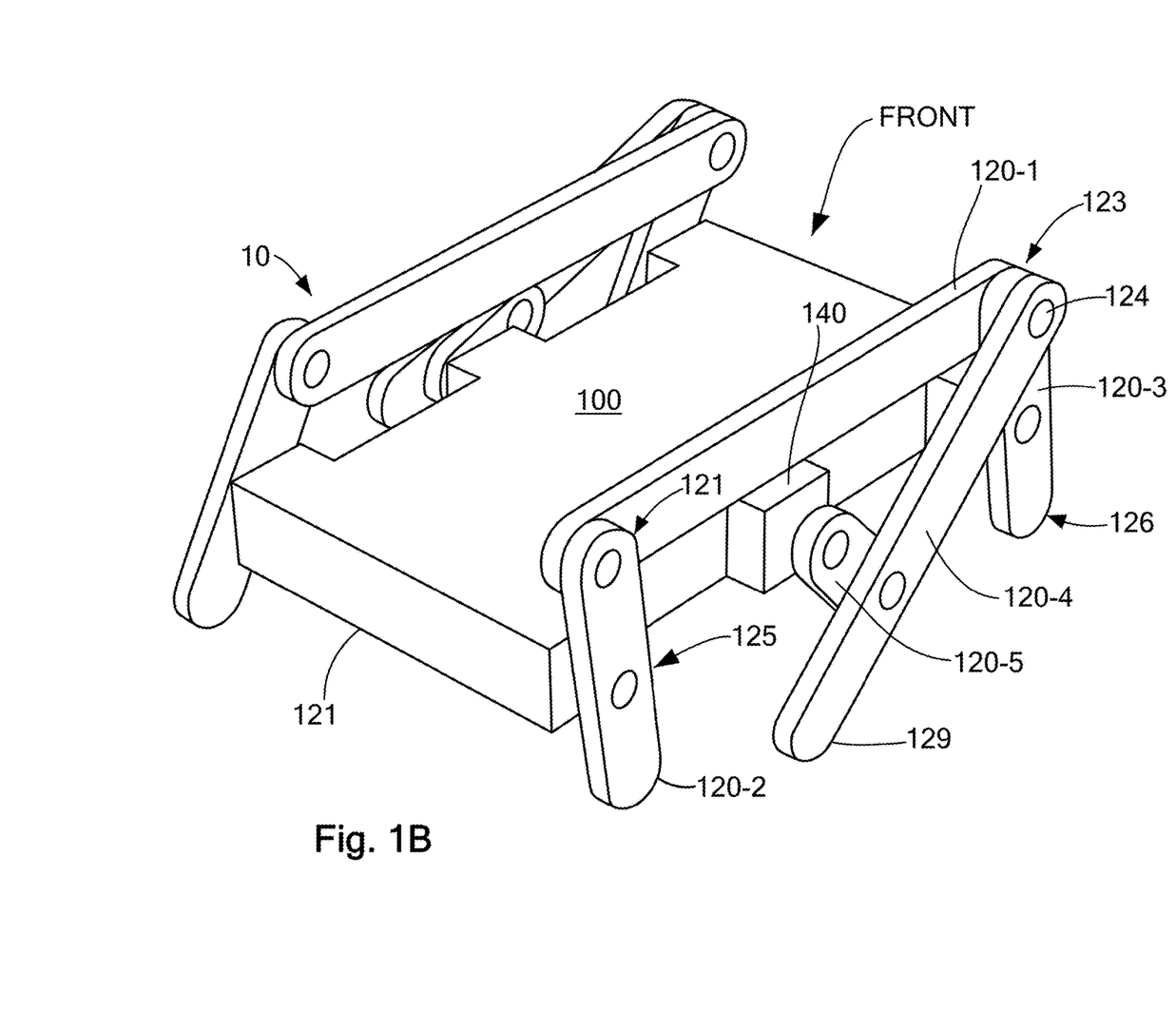
Figure 1C:
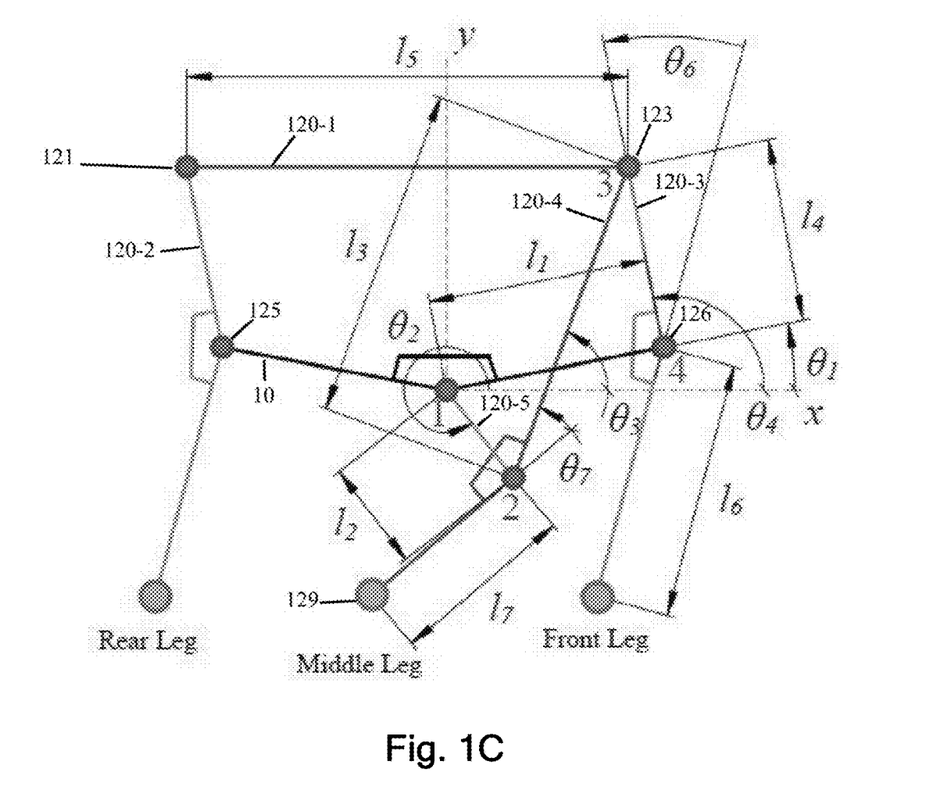
FIG. 1c is a schematic drawing of the line segments and arc segments defining the kinematics in the model of FIG. 1b.

FIG. 1a is a perspective view of a robotic configuration 10 formed from planar material based structural components. FIG. 1b is a three dimensional model of the beams and linkages of FIG. 1a, and FIG. 1c is a schematic drawing of the line segments and arc segments defining the model of FIG. 1b. Referring to FIGS. 1a, 1b and 1c, a platform 100 is flanked by leg assemblies 112-1, 112-2 (112 generally). Each leg assembly 112 has a plurality of beams attached by linkages. Any suitable arrangement of beams and linkages may be employed to define the system of robotic members operable for ambulatory or other operation. In the configuration of FIGS. 1a-1c, each assembly includes beams 120-1 . . . 120-5 (120 generally). A connector beam 120-1 extends lengthwise substantially the length of the platform 100. A front leg 120-3 pivotally connects at the top to a front end 122 of the connector beam 120-1, and pivotally connects to the platform 100 at a midsection 126, as the bottom end also operates as a leg. A rear leg beam 120-2 attaches pivotally at the top to a rearward end 121 of the connector beam 120-1, and at a midsection 125 to a forward side of the platform. A bottom end operates as a leg in synchronized contact with a walking surface along with the other legs. A transverse beam 120-4 connects a pivot linkage 124 of the beams 120-1 and 120-3 to a rotating drive beam 120-5, and also extends to a distal end 129 to form a middle leg. A drive motor 140 rotates the drive beam 120-5 for oscillating the beams 120-2, 120-3 and 120-4 defining the front, middle and rear legs for ambulatory movement of the platform 100. The drive beam may take a more substantial form to provide adequate rotational force, which involves a rotating pin connection through an aperture in the transverse beam 120-4, In this manner, the interconnected functional members define a set of robotic members operative for mobility resulting from cyclic articulation of the robotic members to generate a walking type of movement along a substantially horizontal surface from each leg assembly 112.

Upon pattern generation, the generated pattern is applied to a continuous sheet of the planar material for forming the interconnected functional members. The functional members include the beams and linkages, such that the beams have a rigidity greater than the unfolded planar material and the linkages secure a plurality of the beams in an articulated or rotational arrangement. The example arrangement includes forming the beams by folding along the generated creases to define an elongated member having a triangular cross section. It is expected that a triangular cross section provides the optimal strength to weight ratio of the resulting beam, although other polygonal cross sections (e.g. square or rectangular) may be employed. A triangular cross section of a folded polyester sheet typically has a greater strength to weight ration than a steel beam, due largely due to the lightweight nature of the materials. Fabrication costs are also greatly reduced.

Figure 2:
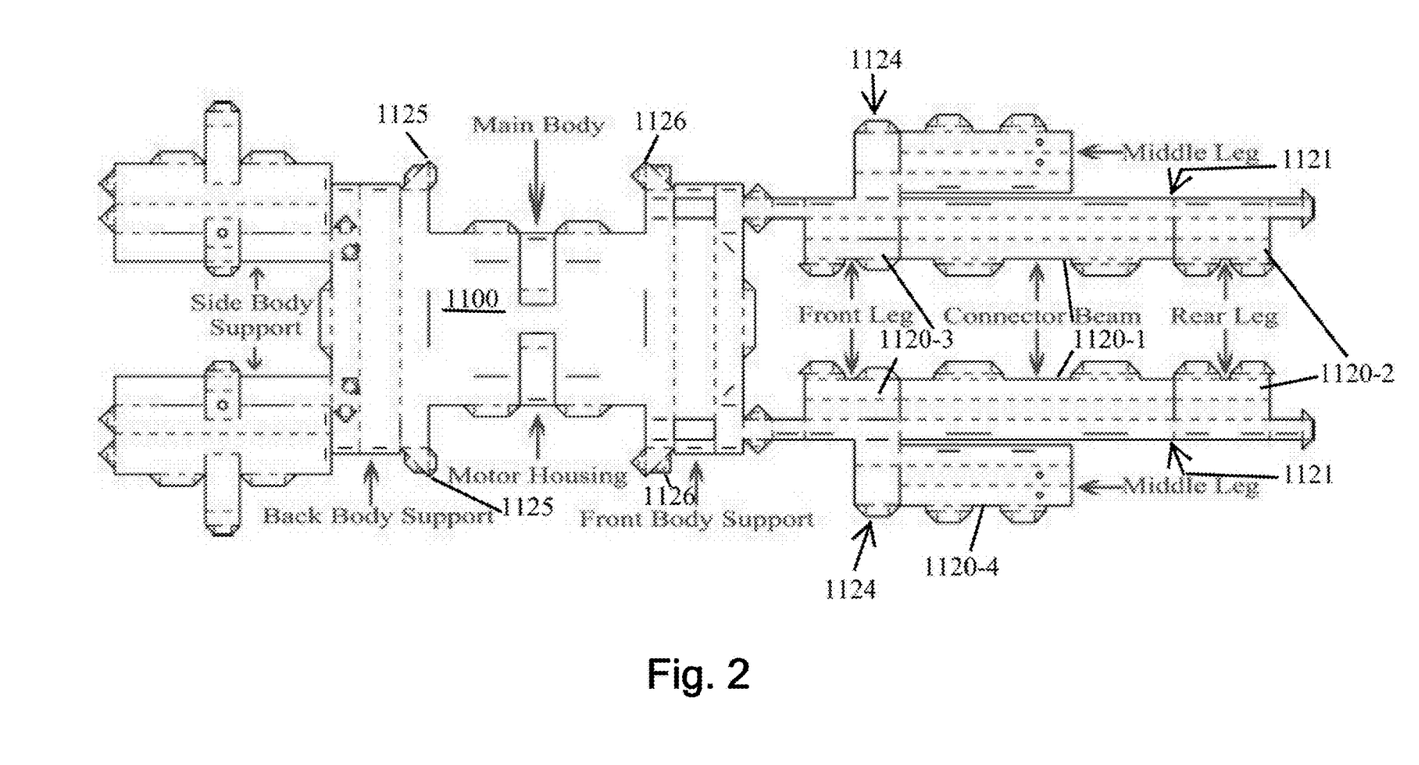

FIG. 2 is a diagram of the pattern defining the cuts and folds (creases) for the robotic configuration of FIG. 1a. Referring to FIGS. 1a-2, a planar sheet 1000 denotes creases as dotted lines and cuts as solid lines for defining the beams 120 and linkages. Tabs 200 engage slots 202 for establishing connections to define the beams 120 and linkages. A main body pattern 1100 defines the platform 100, and includes side body supports 1110 that help support the motor housing 140 by extending laterally along the sides. A front leg cutout 1120-3 defines the front leg 120-3, and shares continuity at pivot point 1124 with a middle leg cutout 1120-4 and connector beam cutout 1120-1. The connector beam cutout 1120-1 joins with a rear leg cutout 1120-2 at a pivot point 1121. Front leg tabs 1126 attach to the platform 1100 and define the midsection 126, and rear leg tabs 1125 pivotally attach the rear legs 1120-2 at the midsection 125.

FIGS. 3a-3e show the various types of linkages. Referring to FIGS. 3a-3e, FIG. 3a shows a pattern for a beam 120. Crease lines 150 define a fold pattern to form a triangular beam. Any suitable polygonal shape may be employed, however a triangular pattern is typically the most efficient. Slots 152 define cutouts for engaging tabs 156 or keys. The linkages include a planar appendage on a linking beam and a corresponding aperture on a linked beam, in which the planar appendage having an expanding dimension following insertion in to the aperture. The inserted appendage provides a resilient communication between the linked beams, such that the expanded dimension of the planar appendage resisting removal from the aperture.

Figures 3A, 3B, 3C:
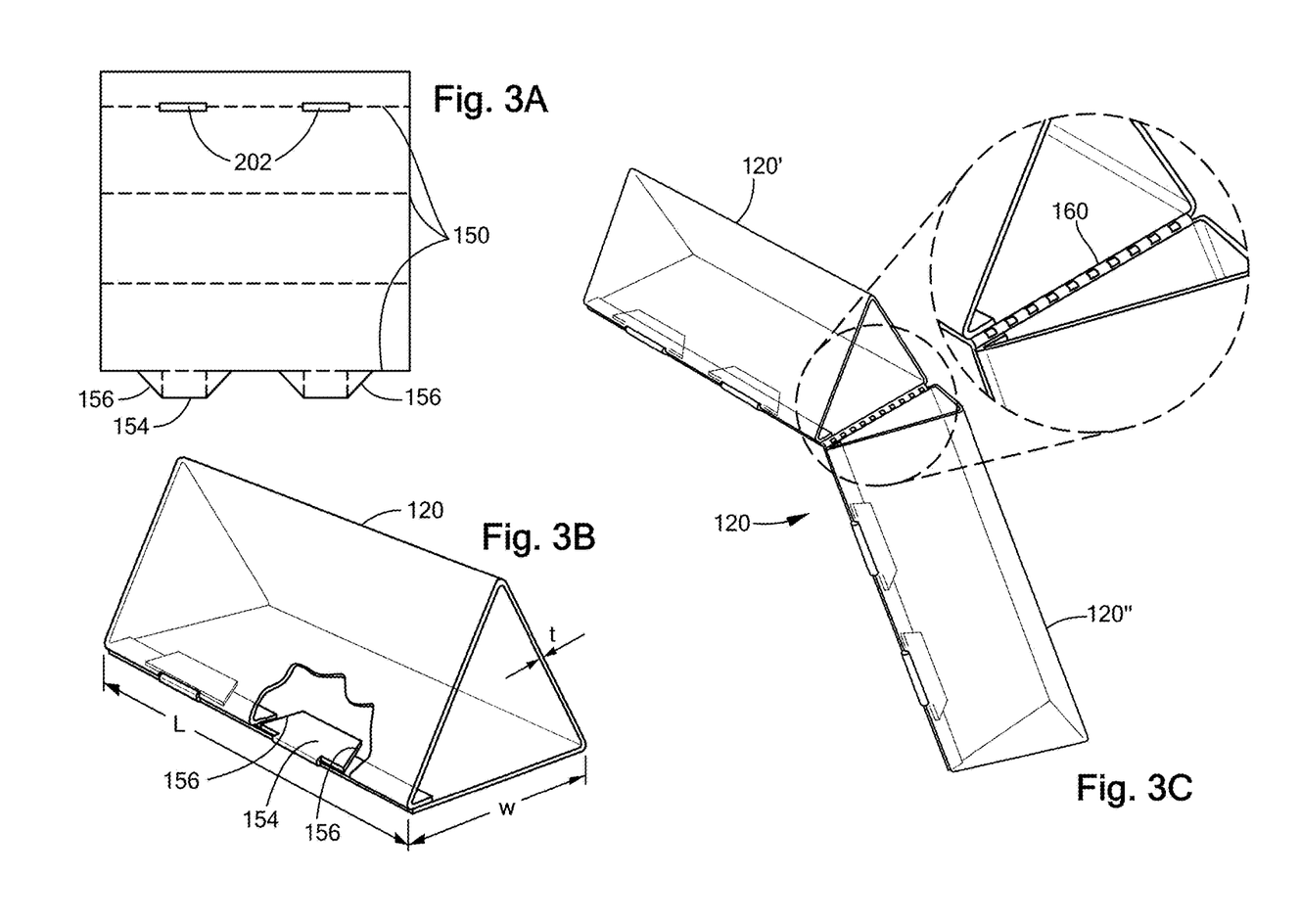
FIGS. 3a-3e show the various types of linkages.

The tabs 154 have separately hinged wings 156 that fold adjacent to the tab for reducing a size of the tab 154 for insertion into the slot 152, and unfold following insertion to a dimension larger than the slot for maintaining insertion and provide a "one way" insertion capability. FIG. 3b shows the assembled (folded) beam 120 with the expanded tabs 154 as the wings 156 unfold. The hinged (folded) wings 156 are small enough for insertion into the corresponding slot, and become fixed upon unfolding to resist removal as the unfolded shape does not align with the insertion slot. The linkages therefore include a foldable appendage, in which the foldable appendage has a folded state and an unfolded state, such that the folded state has a dimension smaller than the aperture for insertion into the aperture, and the unfolded state has a dimension larger than or unaligned with the aperture for retention following insertion. While the unfolded state of the wings need not linearly align with the tab, the linkage is defined by a substantially rectangular protrusion having folding tabs on opposed sides of the rectangular protrusion, such that the folding tabs extend beyond a length of the aperture in an unfolded state. It is usually sufficient that the wings expand at an angle relative to the slot so that removal is prevented.

In the example configuration, articulated joints up to 180° are achieved by a linkage defined by a triangular cross section in the beam when the cross section is severed along a plurality of sides of the linkage such that a single remaining flexible planar segment defines an articulated attachment.

FIG. 3b shows an articulated linkage in a beam 120. Cuts extending through all but one planar side of a beam (2 of 3 sides in the case of a triangular beam) leave a pivotal hinge 160 as the beam exhibits articulated portions 120' and 120" that remain attached at the hinge.

Figure 3D:
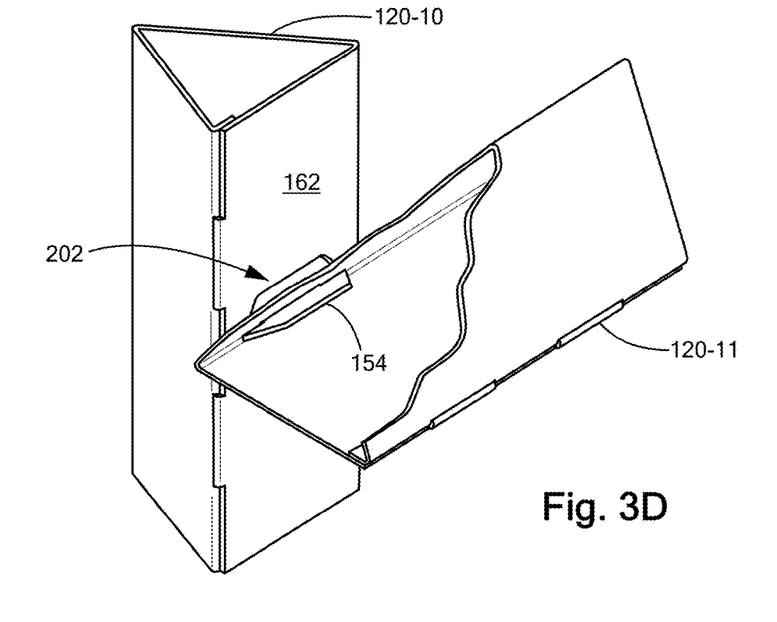

FIG. 3d shows a revolute joint using a tab 154 cut from a flush or inner portion of a beam 120-10 face 162, rather than an edge as in FIGS. 3a-b. A slot 202 in the linked beam 120-11 engages the tab 154 for providing a pivoting linkage within the deformable resilience of the planer material defining the tab 154.

Figure 3E:
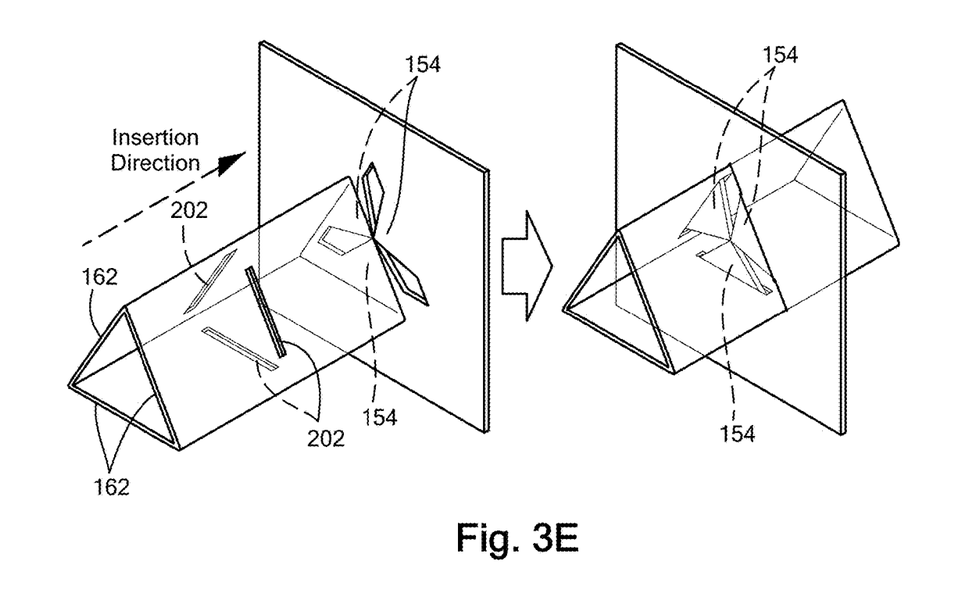

FIG. 3e shows an insertion lock which resembles a multi-faceted linkage having multiple tabs 154 inserted into each face 162 of the beam 120 by engaging a respective slot 202 in the beam 120. In this functional unit the linkage is defined by a pologonal aperture having tabs defined by the sides of the polygon and adapted for engagement with the beam, such that the beam has elongated apertures at a common cross section adapted for insertion of the tabs.

Figure 4:
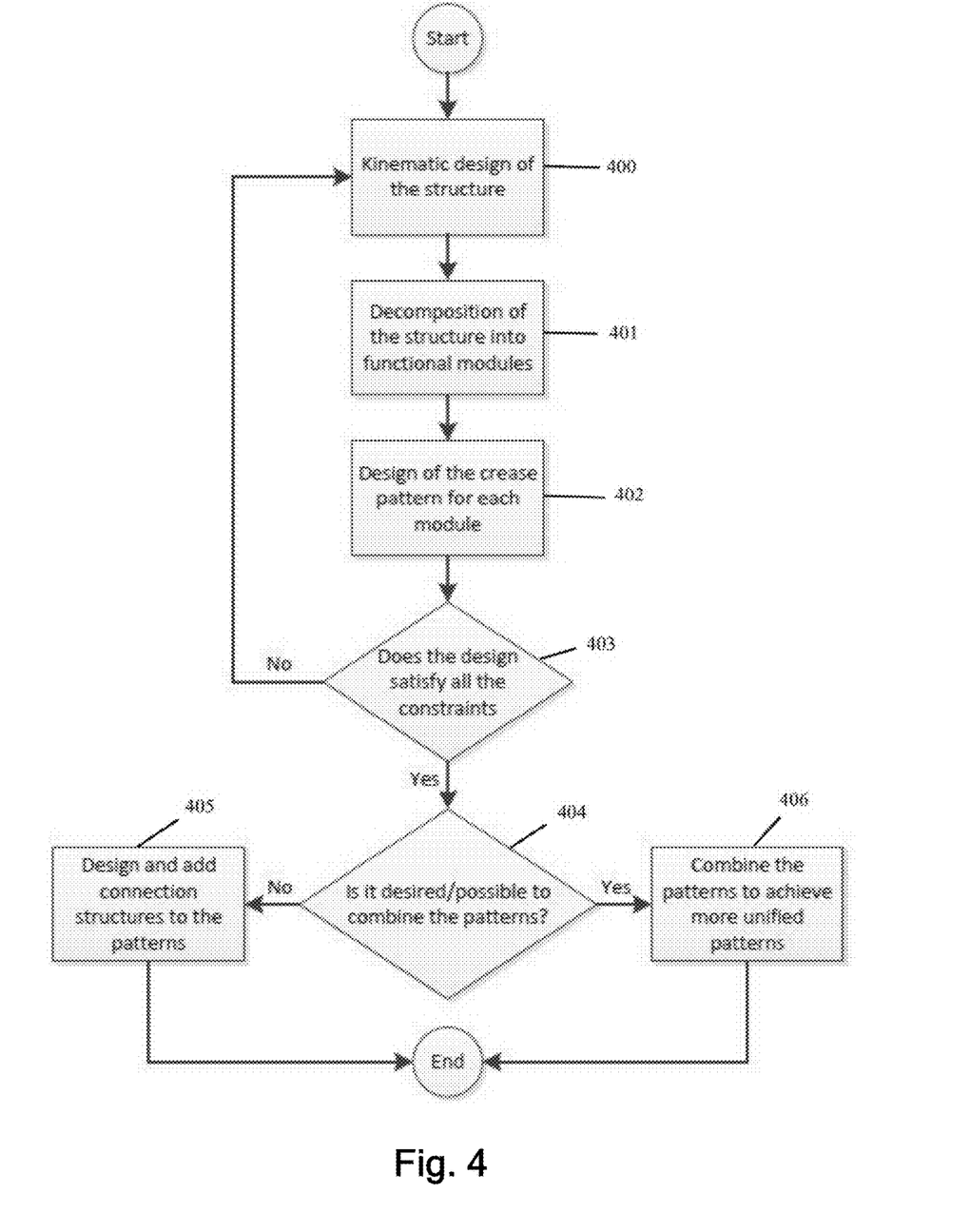

Based on the complexity of the overall structure of the robotic configuration, it may not be feasible to construct it from a unified crease pattern. On the same note, it may be desirable to fabricate the structure form groups of sub-units. Such a justification can be based on the space and complexity requirements of the storage and fabrication process. FIG. 4 is a flowchart for design of the pattern defining the robotic configuration of FIG. 1a. Referring to FIG. 4, the design process starts with structure and kinematic synthesis of the system, as depicted at step 400. In this phase, the design process omits constraints associated with folding techniques in order to finalize the initial concept. The process follows by decomposing the structure into functional subsections such as: independently actuated mechanisms, support structures, motor housings, and linkages, as shown at step 401. The next step is designing (or reusing existing) crease patterns for each one of the subsections, as depicted at step 402. As discussed above, the crease pattern for each subsection defines a functional unit and can be constructed from basic structures and combinations of other functional units, such as beams and linkages, At this stage, an evaluation occurs for feasibility of the design based on constraints related to folding techniques, as depicted at step 403. If it is not advisable or efficient to construct a functional unit using folding techniques, either the overall design should be reconsidered, or that specific unit needs to be fabricated with an alternative process and assembled as discrete components by reverting to step 400. After designing all functional units, a check occurs at step 404 to assess combining the separate crease patterns into a unified pattern, as shown at step 406. Alternately, the check at step may conclude that it is desirable to fabricate the assembly from discrete crease patterns, the next step will be designing the corresponding connections and joints between the functional units using key-slot fasteners and insertion, as depicted at step 405.

Figure 5A:
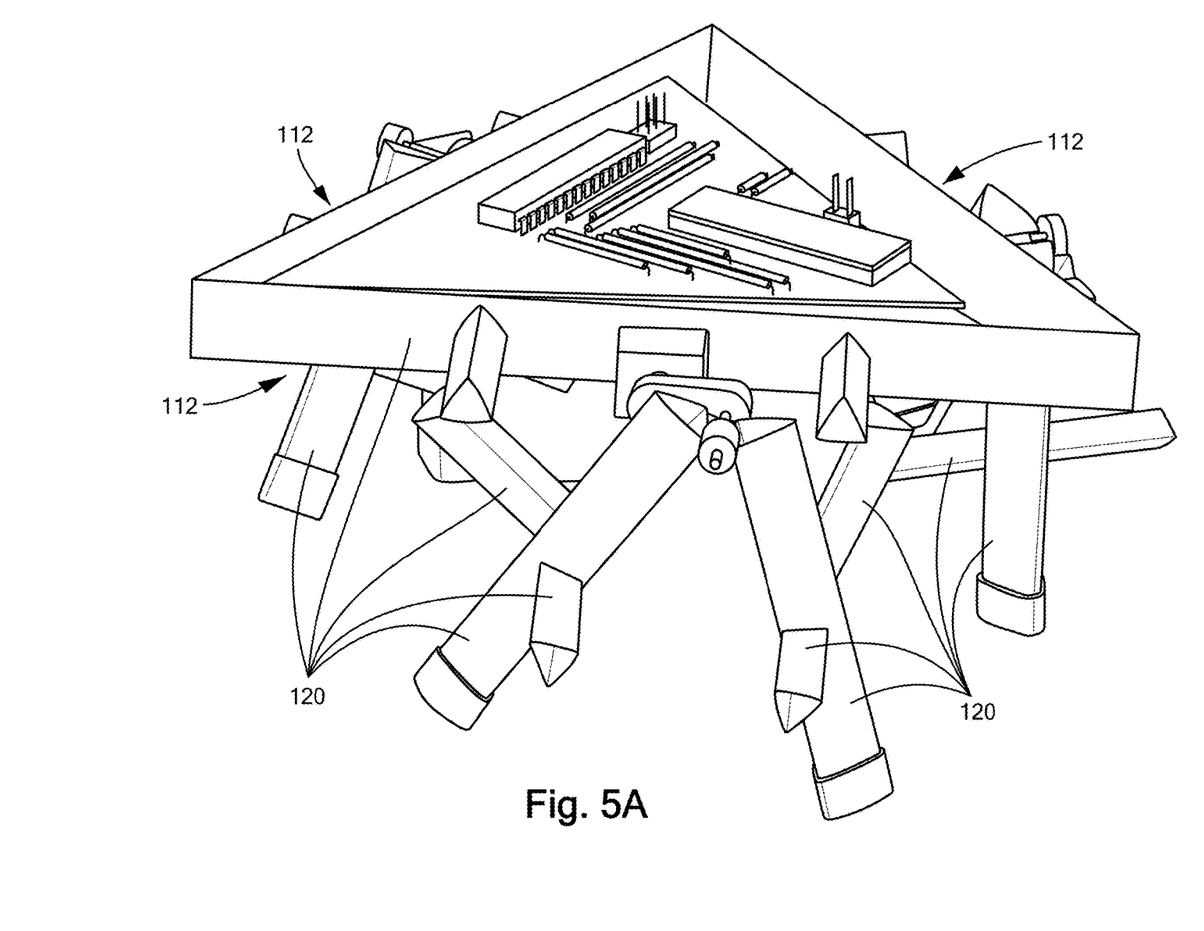
FIGS. 5a-5c show an alternate configuration of the robotic configuration having a triangular base platform.
Figure 5B:
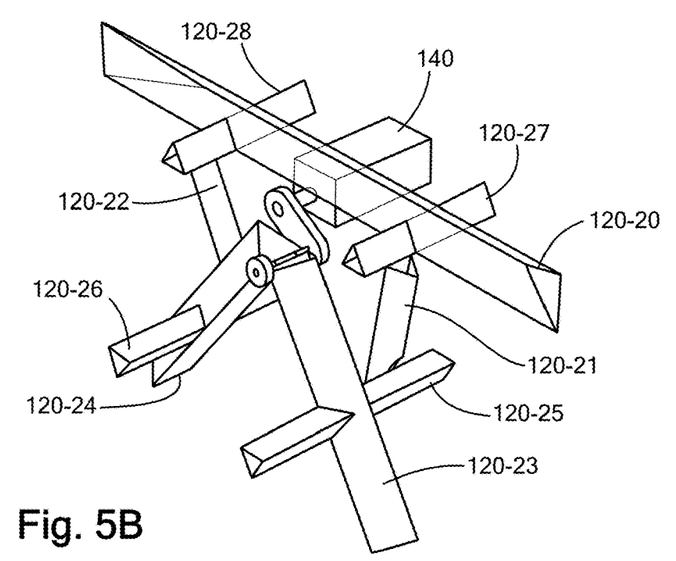
Figure 5C:
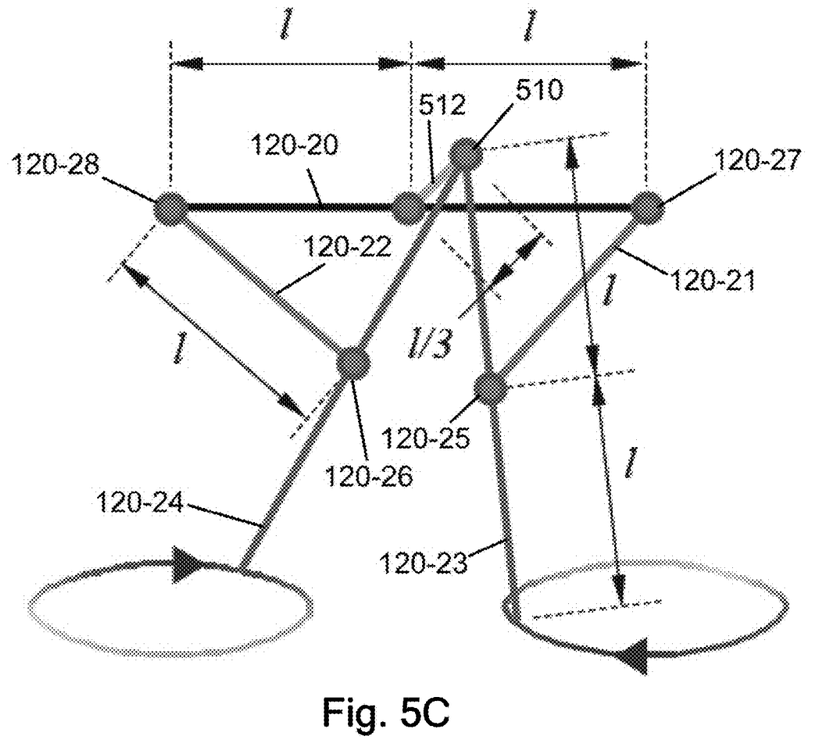

FIGS. 5a-5c show an alternate configuration of the robotic configuration having a triangular base platform. The triangular base platform 500 has a leg assembly on each of the three sides. Each leg assembly has two legs, in contrast to the 3 legs per leg assembly of the rectangular base 100 of FIGS. 1a-1c. An arrangement of functional units including beams 120 and linkages as in FIGS. 3a-3e deploys the legs in an ambulatory manner. Referring to FIGS. 5a-5c, a frame beam 120-20 defines or is attached to the triangular base 500. Hinge beams 120-27 and 120-28 attach perpendicularly to the frame beam 120-20. Transverse beams 120-21 and 120-22 connect the hinge beams 120-27 and 120-28 to leg pivot beams 120-25 and 120-26, Leg beams 120-23 and 120-24 join at a midsection to the leg pivot beams 120-25 and 120-26, and are joined at an articulated joint 510 to a drive arm 512 from the drive motor 140. Lower ends of the leg beams 120-23 and 120-24 define the legs for ambulating across a surface. Drive member 512 may be a beam 120, or may be a solid member more suited to drive force from the motor 140, and connects to the articulated joint 510 via a drive pin and aperture for imparting rotary motion.

Figure 6:
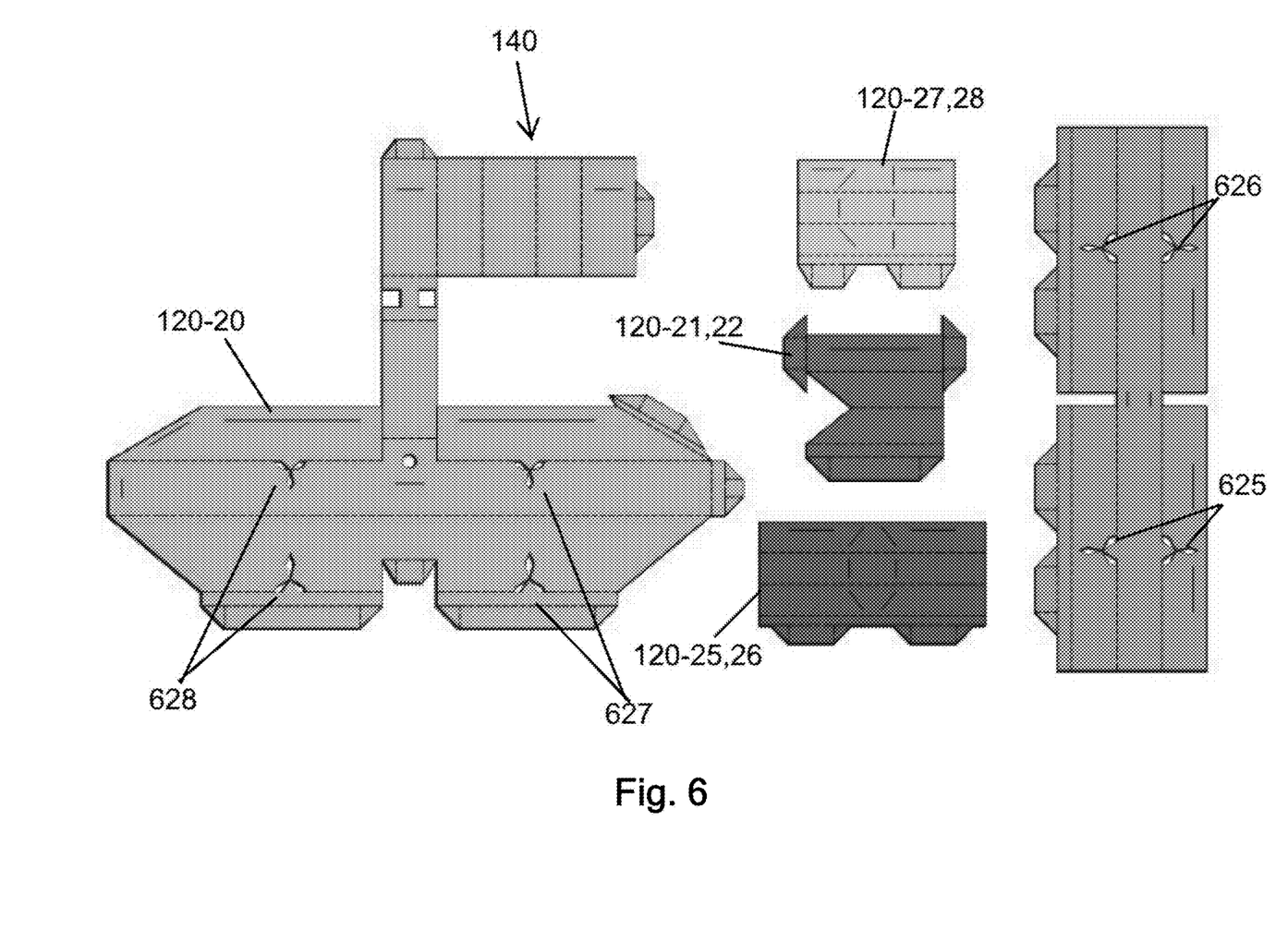
FIG. 6 shows a diagram of the pattern defining the robotic configuration of FIGS. 5a-5c.

FIG. 6 shows a diagram of the pattern defining the robotic configuration of FIGS. 5a-5c. Referring to FIGS. 5a-6, a frame beam 120-20 includes the motor assembly 140. The hinge beams 120-27, 120-28 engage insertion lock cutouts 627 and 628 in the frame beam 120-20. Similarly, leg beams 120-23, 120-24 have insertion lock cutouts 625 and 626 for engaging leg pivot beams 120-25 and 120-26. An articulated joint 510 joins the leg beams 120-23, 120-24.

Figure 7:
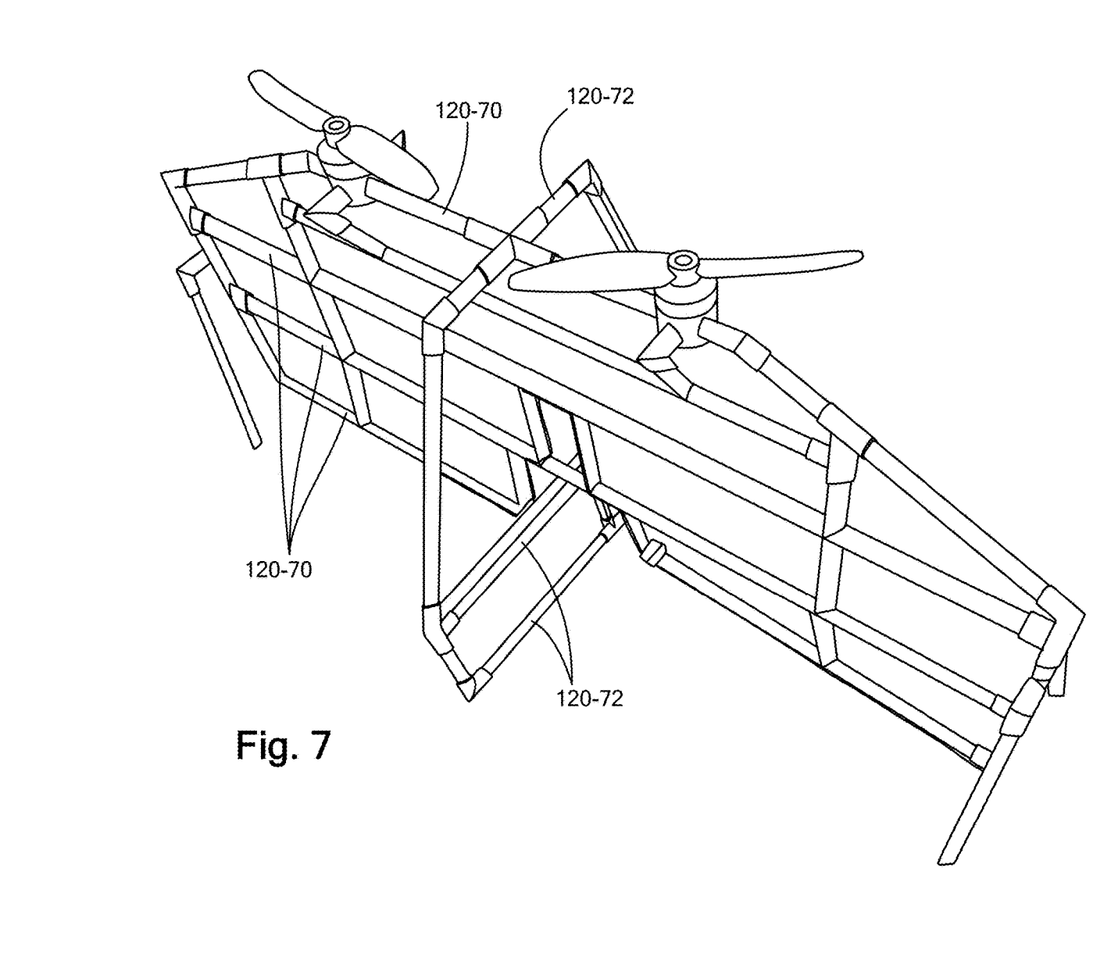
FIG. 7 is a drone configuration including two motors in an elongated frame.

FIG. 7 is a drone configuration including two motors in an elongated frame. Referring to FIG. 7, the lightweight features of the robotic configuration are suitable for airborne operation in a drone. A plurality of parallel beams 120-70 are stabilized by transverse perpendicular beams 120-72 for supporting motor assemblies 140-1 . . . 140-2.

Figure 8:
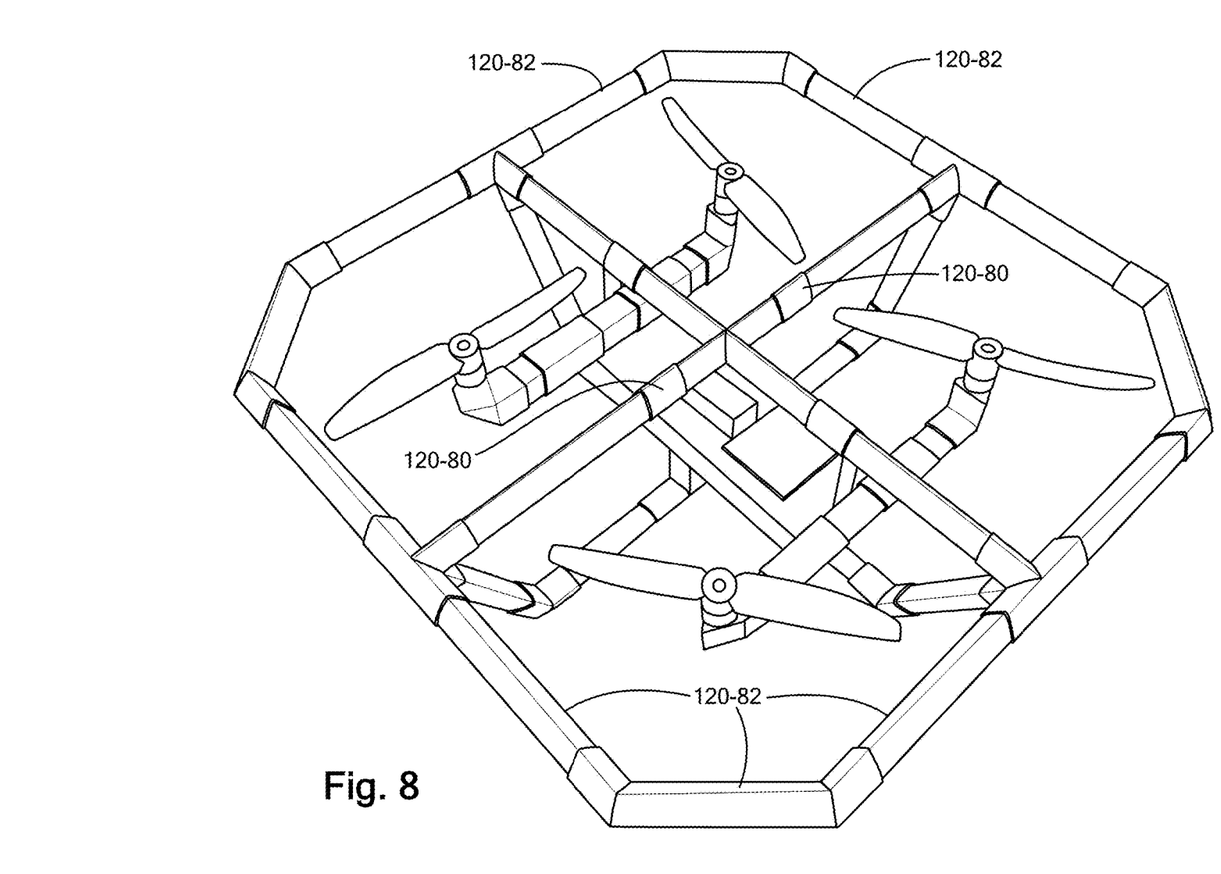
FIG. 8 is a drone configuration including four motors in a rectangular arrangement.

FIG. 8 is a drone configuration including four motors in a rectangular arrangement. Referring to FIG. 8, central perpendicular beams 120-80 are surrounded by circumferential beams 120-82, defining a quadrant structure with a motor assembly 140-1 . . . 140-4 in each quadrant. While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of fabricating robotic members, comprising:
generating a pattern on a planar material, the pattern including creases and cuts on the planar material for defining functional units operative for robotic movement;
cutting the planar material along the generated cuts;
folding the planar material along the generated creases;
forming interconnected functional members based on the cut and folded planar material,
the interconnected functional members including a plurality of beams and linkages, each beam of the plurality of beams having a rigidity greater than the planar material and at least one linkage of the plurality of linkages securing a first beam and a second beam, the linkage defined by a polygonal aperture in the first beam, the polygonal aperture in the shape of a polygon having a plurality of sides and having tabs defined by sides of the polygon and adapted for engagement with the second beam, the second beam having a cross section based on the polygon and elongated apertures resulting from the generated cuts at a common cross section adapted for insertion of the tabs of the first beam into the generated cuts.

2. The method of claim 1 further comprising applying the generated pattern to a continuous sheet of the planar material for forming the interconnected functional members.

3. The method of claim 1 wherein the linkages secure a plurality of the beams in an articulated arrangement.

4. The method of claim 3 further comprising forming the beams by folding along the generated creases to define an elongated member having a triangular cross section.

5. The method of claim 3 wherein the linkages include a planar appendage on a linking beam and a corresponding aperture on a linked beam, the planar appendage having an expanding dimension following insertion in to the aperture, the inserted appendage providing a resilient communication between the linked beams, the expanded dimension of the planar appendage resisting removal from the aperture.

6. The method of claim 3 wherein the linkages include a foldable appendage, the foldable appendage having a folded state and an unfolded state,
the folded state having a dimension smaller than the aperture for insertion into the aperture; and
the unfolded state having a dimension larger than the aperture for retention following insertion.

* * * * *